(12) United States Patent
Peters

(10) Patent No.: US 7,562,570 B2
(45) Date of Patent: Jul. 21, 2009

(54) ULTRASONIC OIL/WATER TANK LEVEL MONITOR HAVING WIRELESS TRANSMISSION MEANS

(75) Inventor: George W. Peters, Newport Beach, CA (US)

(73) Assignee: OleumTech Corporation, Irvine, CA (US)

( * ) Notice: Subject to any disclaimer, the term of this patent is extended or adjusted under 35 U.S.C. 154(b) by 92 days.

(21) Appl. No.: 11/373,779

(22) Filed: Mar. 13, 2006

(65) Prior Publication Data

US 2007/0209434 A1    Sep. 13, 2007

(51) Int. Cl.
   *G01F 23/28* (2006.01)
(52) U.S. Cl. .................................. 73/290 V
(58) Field of Classification Search ............... 73/290 V; 342/124; 116/227; 367/908, 98
   See application file for complete search history.

(56) References Cited

U.S. PATENT DOCUMENTS

| | | | |
|---|---|---|---|
| 4,470,299 A | 9/1984 | Soltz | 73/290 V |
| 4,487,065 A | 12/1984 | Carlin et al. | 73/290 V |
| 4,523,460 A | 6/1985 | Strickler et al. | 73/200 |
| 4,578,997 A | 4/1986 | Soltz | 73/290 V |
| 4,675,854 A | 6/1987 | Lau | 367/98 |
| 4,868,797 A | 9/1989 | Soltz | 367/98 |
| 4,928,525 A | 5/1990 | Aderholt et al. | 73/290 V |
| 5,131,271 A * | 7/1992 | Haynes et al. | 73/290 V |
| 6,967,589 B1 * | 11/2005 | Peters | 340/854.6 |

* cited by examiner

*Primary Examiner*—Hezron Williams
*Assistant Examiner*—Tamiko D Bellamy
(74) *Attorney, Agent, or Firm*—Morland C. Fischer

(57) ABSTRACT

An ultrasonic monitor to measure the level of a fluid (e.g., oil or water) within a storage tank. The ultrasonic monitor is surrounded by a gas-tight, explosion-proof casing that is coupled to the top of the tank so that the acoustic axis of a (e.g., 59 KHz) ultrasonic transducer is directed downwardly towards the surface of the fluid. The ultrasonic transducer is encased within a protective (e.g., Delrin) housing so as to resist the hostile (e.g., acidic, gaseous vapors and extreme temperature) conditions within the tank. A main CPU is interconnected between the ultrasonic transducer and an RF transceiver having an antenna from which fluid level data calculated by the main CPU can be transmitted over a wireless communication path. A reference rod having at least one acoustic reflector located at a known distance therealong extends downwardly from the housing of the ultrasonic transducer towards the surface of the fluid. The main CPU is responsive to the time of flight between incident signals generated by the acoustic transducer and return and echo signals reflected off the surface of the fluid and the acoustic reflector for calculating the corresponding distance between the fluid and the transducer. The main CPU is adapted to adjust the time of flight to compensate for errors introduced by the environment (e.g, gas vapors, pressure, etc.) of the tank depending upon the echo signal that is reflected to the acoustic transducer by the reflector of the reference rod.

27 Claims, 7 Drawing Sheets

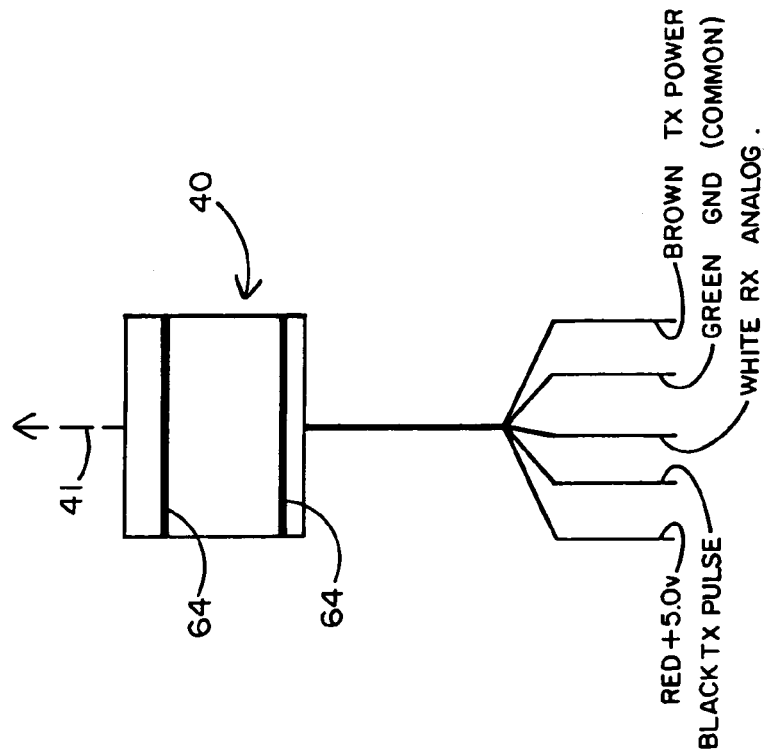
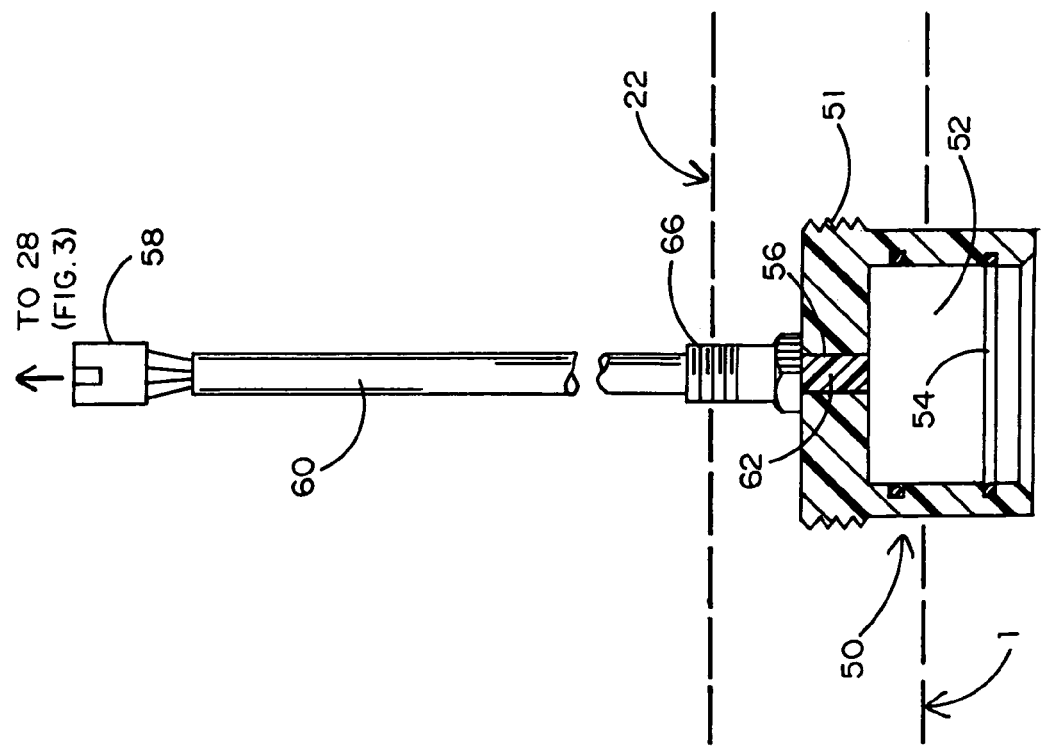
FIG. 5
FIG. 4

ULTRASONIC OIL/WATER TANK LEVEL MONITOR HAVING WIRELESS TRANSMISSION MEANS

BACKGROUND OF THE INVENTION

1. Field of the Invention

This invention relates to a fluid level monitor having an ultrasonic transducer that is adapted to accurately detect the level of oil or water in a storage tank of the kind that is typically located in the field near an oil or gas well. The monitor includes an explosion proof casing and wireless transmission means by which fluid level data is sent to a remote mobile or stationary data collector or relay.

2. Background Art

It is desirable to be able to monitor the level of oil (or water) that is removed from an oil (or gas) well and stored within a recovery tank near the well. Accurate monitoring is required to reduce the risks of an overflow condition and potential oil spillage at the tank site which could result in an environmental and/or safety hazard. One conventional technique to accomplish such oil level monitoring is for a workman to go out in the field and drive from tank-to-tank. The workman climbs to the top of each tank, and a string or similar line is then dropped into the tank from above to measure the oil level. The workman manually records the oil levels of the tanks and then returns to his base of operation. The aforementioned technique of having to visit the tanks in the field on a one-by-one basis at which to use a string test line and make a manual record of the oil levels is very time consuming, expensive and not completely accurate. Moreover, the monitoring procedure is completed at relatively long intervals, such that a tank approaching full capacity may not be detected in time to avoid an overflow.

Ultrasonic tank level monitoring methods are known. However, such ultrasonic methods tend to be inaccurate because they fail to take into account the environment within the tank in which the level measurements are to be taken. For example, temperature and pressure changes within the tank, surface ripples, a short measurement range to the surface of the oil, and hydrocarbon vapors which fill the tank above the oil may all give rise to false readings and an indication of more or less oil than is actually present. In addition, conventional ultrasonic monitoring methods are typically limited to tanks which are no greater than twelve feet high. Moreover, few ultrasonic tank level monitors are capable of transmitting data by wireless transmission means. In this regard, the level data is often transmitted over wire lines which mandates an independent source of power, increases the cost of installation and maintenance, and limits the rate and range at which data can be transmitted. Furthermore, a costly vapor tight conduit running above the tank is also required to surround and protect those wires which transmit the oil level data.

The environment in which the tank level measurements are taken is known to be very hostile and corrosive. More particularly, the environment inside and surrounding an oil storage tank is typically acidic, includes a high concentration of potentially volatile vapors, and is subject to temperature extremes which often range from as low as −30 degrees C. to as high as +60 degrees C. Workmen who must enter the hazardous environment of an oil well and its neighboring storage tank to collect or receive oil level data are exposed to personal risk. In this same regard, there is no known ultrasonic tank level monitoring equipment currently in use that is both gas tight and explosion proof so as to ensure the ability of the monitoring equipment to function properly in such a hostile environment.

Accordingly, it would be desirable to have a low maintenance, battery powered ultrasonic oil level monitor that is encased in a gas tight/explosion proof casing which can be quickly and easily coupled to a storage tank and that is adapted to transmit highly accurate oil level data to a location outside the explosive environment of the tank by low power wireless means so as to avoid the problems and inherent risks that have heretofor been associated with conventional oil tank level monitors and data transmission techniques.

SUMMARY OF THE INVENTION

A wireless fluid level monitor is disclosed having an ultrasonic transducer that is capable of providing an accurate indication of the level of oil or water that is stored in a recovery tank of the kind that is typically located within an explosive environment near an oil or gas well. The fluid level monitor is coupled to an existing fitting at the top of the tank such that the ultrasonic transducer is received within the tank below the top, and the acoustic axis of the ultrasonic transducer is directed vertically downward towards the fluid to be monitored. The fluid level monitor is surrounded and protected by a gas tight and explosion proof rated casing. An RF transceiver having an antenna is capable of sending data to a mobile or stationary data collector or relay that is located outside the explosive environment by which to indicate the level of oil/water in the tank, the rate at which the tank is being filled, and the volume (in barrels) of oil/water in the tank, so that the efficiency of the well associated with the tank can be determined.

The wireless fluid level monitor includes a main CPU and a low current power supply which is controlled by the main CPU and is normally inactive except when tank level readings are to be taken. An internal real time clock is set to enable (i.e., wake up) the main CPU at regular (e.g., one hour) intervals so as to check for an alarm (e.g., tank overflow) condition. A pair of parallel connected 3.6 volt lithium ion batteries are connected to an input terminal of the power supply. An ultrasonic transducer is driven by a step-up controllable voltage regulator of the power supply. The ultrasonic transducer is mounted below the top of the tank and adapted to operate at a frequency of 59 KHz. Because of the corrosive and hostile environment within which the tank level measurements are to be taken, the ultrasonic transducer is sealed in Teflon and then encased within a protective (e.g., Delrin) housing. An ultrasonic transceiver is responsive to raw analog incident and reflected signals being transmitted by and returned to the ultrasonic transducer. The analog signals are conditioned and filtered by the ultrasonic transceiver and supplied to A/D terminals of the main CPU where the signals are digitized and stored in an internal RAM of the CPU. The main CPU computes the distance between the surface of the oil and the ultrasonic transducer depending upon the time of flight between the incident and reflected transducer signals.

Instead of waiting for its internal clock to wake up the main CPU on a periodic basis, an optional wake up means is provided to allow tank level measurements to be taken on an as-needed basis. In this case, an infrared sensor is located behind a sealed transparent panel in the explosion proof casing of the fluid level monitor. The infrared sensor is responsive to a sudden change in temperature (e.g., such as when a technician passes his hand in front of the transparent panel) for causing the main CPU to wake up and initiate a tank level measurement, the results of which are available on a display that is located behind the transparent panel.

The RF transceiver of the wireless fluid level monitor includes a self-contained CPU that is interfaced with a serial I/O terminal of the main CPU. The CPU of the RF transceiver is awakened on a periodic basis by an internal real time clock thereof to determine if the transceiver is being selectively polled for tank level data by the mobile or fixed data collector or relay. In the event that a polling signal is detected (according to a unique ID number assigned to the fluid level monitor), the CPU of the RF transceiver will wake up the main CPU and input an instruction set thereto. Tank level data computed by the main CPU is returned to the RF transceiver to be transmitted from the antenna thereof over a wireless communication path back to the data collector or relay within which the data is stored for later evaluation or relayed to another location. If a polling ID signal is not detected by the CPU of the RF transceiver, then the CPU returns to a sleep (i.e., inactive) state.

In order to permit the oil level readings to be calibrated for accuracy, a reference rod is affixed to the protective housing in which the ultrasonic transmitter is encased, so that the reference rod extends downwardly from the top of the tank towards the surface of the oil to be monitored. The reference rod carries one or more (e.g., stainless steel) acoustic reflectors that are attached (e.g., pinned) at predetermined fixed (e.g., four foot) intervals therealong. Each reflector lies within the ultrasonic beam and is adapted to reflect an echo pulse back to the ultrasonic transducer. Depending upon the time of flight between the incident pulse and the echo pulse, the main CPU of the fluid level monitor calculates the distance of the reflector from the ultrasonic transmitter and compares this distance with the known fixed distance. The main CPU will then make corresponding compensations to the time of flight between the incident pulse and the return pulse that is reflected off the surface of the oil back to the transducer to account for the environment (e.g., temperature, pressure and hydrocarbon vapors) within the tank, whereby to improve the accuracy of the data that is transmitted by the fluid level monitor at its antenna.

BRIEF DESCRIPTION OF THE DRAWINGS

FIG. 4 shows a protective housing to surround and encase an ultrasonic transducer of the ultrasonic oil/water level monitor of FIG. 3;

FIG. 5 shows the ultrasonic transducer to be encased in the protective housing of FIG. 4 and to be aligned with respect to an oil/water tank in the manner illustrated in FIG. 3.

DESCRIPTION OF THE PREFERRED EMBODIMENT

Figure 1:
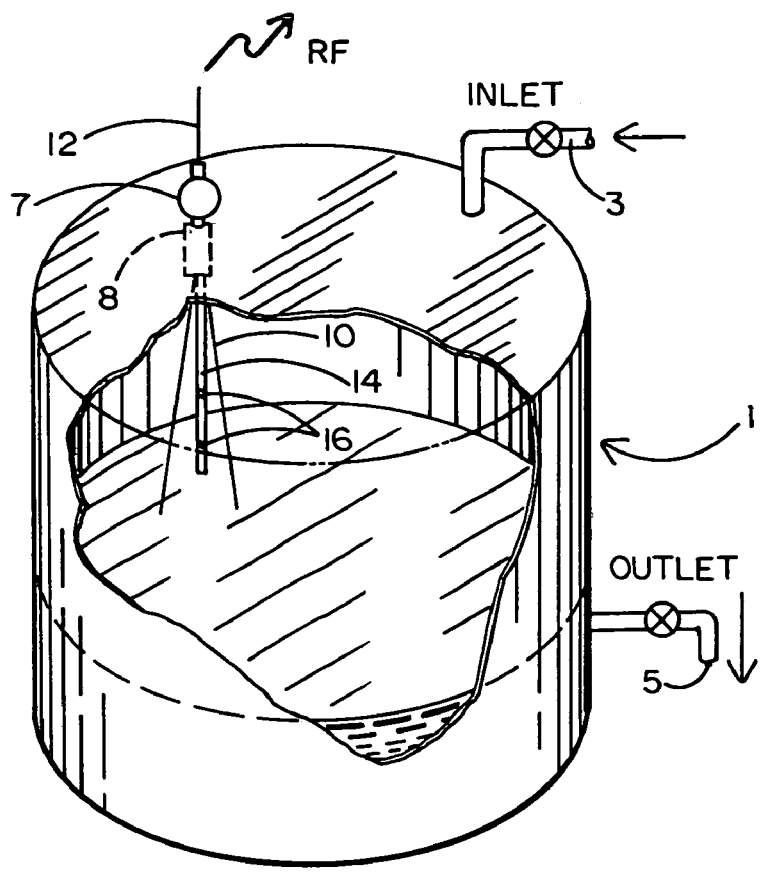
FIG. 1 illustrates an oil/water recovery tank with the ultrasonic oil/water level monitor of the present invention coupled to the top of the tank for measuring the level of oil/water stored therewithin and for transmitting data indicative thereof over a wireless transmission path.

FIG. 1 of the drawings shows a conventional oil storage tank 1 that is located in the field in the vicinity of an oil well. While reference will be made herein to an oil storage tank, it is to be expressly understood that other fluids, such as water, may also be stored within tank 1. The oil tank 1 is filled via an inlet 3 with oil that is pumped from the adjacent oil well. Oil is removed from the tank 1 when full via an outlet 5 to be transported by truck to a refinery for processing. The tank 1 would be typically located adjacent a gas well had water been stored therein instead of oil.

In accordance with the present invention, a wireless fluid level monitor 7 is mounted on top of the tank 1 to be responsive to the level of oil with which the tank is filled or partially filled. As will be explained in greater detail hereinafter, the fluid level monitor 7 includes an ultrasonic transducer having a vertical acoustic axis that is directed downwardly from above the oil to be monitored within tank 1. To this end, and as is best shown in FIG. 4, a protective housing 50 around the ultrasonic transducer includes a set of screw threads 66 to be coupled to the outer casing 22 of monitor 7. The protective housing 50 also has a set of pipe threads 51 to be mated to an existing threaded fitting 8 located at the top of the oil tank 1. In this manner, the ultrasonic transducer of monitor 7 will cast a relatively narrow ultrasonic beam 10 (e.g., across an angle of approximately 10 degrees) downwardly towards the oil to be monitored. A narrow beam width is preferred to prevent reflections off the sides of the tank or from objects (e.g., ladders and pipes) commonly located within the tank that could introduce errors. In this regard, it is preferable that the ultrasonic transducer (designated 40 in FIG. 3) of monitor 7 be positioned immediately below the inside face of the top of oil tank 1. However, in the case where the tank has a center fitting for venting purposes, an extension (not shown) may be required to mount the transducer 40 inside the top of the tank.

As will also be explained in greater detail, the wireless fluid level monitor 7 herein disclosed includes an antenna 12 by which to transmit data over a wireless communication path to a distant location concerning the level of oil within tank 1 so as to provide a warning of a possible overflow condition, the rate at which the tank is filled with oil, and the volume (in barrels) of oil within the tank 1 so that an indication will be readily available to measure the oil producing efficiency of the associated oil well. What is more, by virtue of the fluid level monitor 7 of this invention, the data being transmitted at antenna 12 will have a high degree of accuracy relative to the data that is supplied by conventional fluid level monitors. That is, hydrocarbon vapors above the oil and/or changes in temperature and pressure inside the tank can result in the transmission of erroneous data (e.g., such as where a smaller or greater volume of oil is indicated than that which is actually stored within the tank).

In order to adjust the readings of the fluid level monitor 7 for accuracy, a reference rod or tube 14 extends downwardly from the monitor through the interior of the tank 1. The reference rod 14 has one or a series of acoustic reflectors 16 uniformly spaced (e.g., at four foot intervals) therealong. Details of the reference rod 14 will be described when referring to FIGS. 7 and 8.

Figure 2:
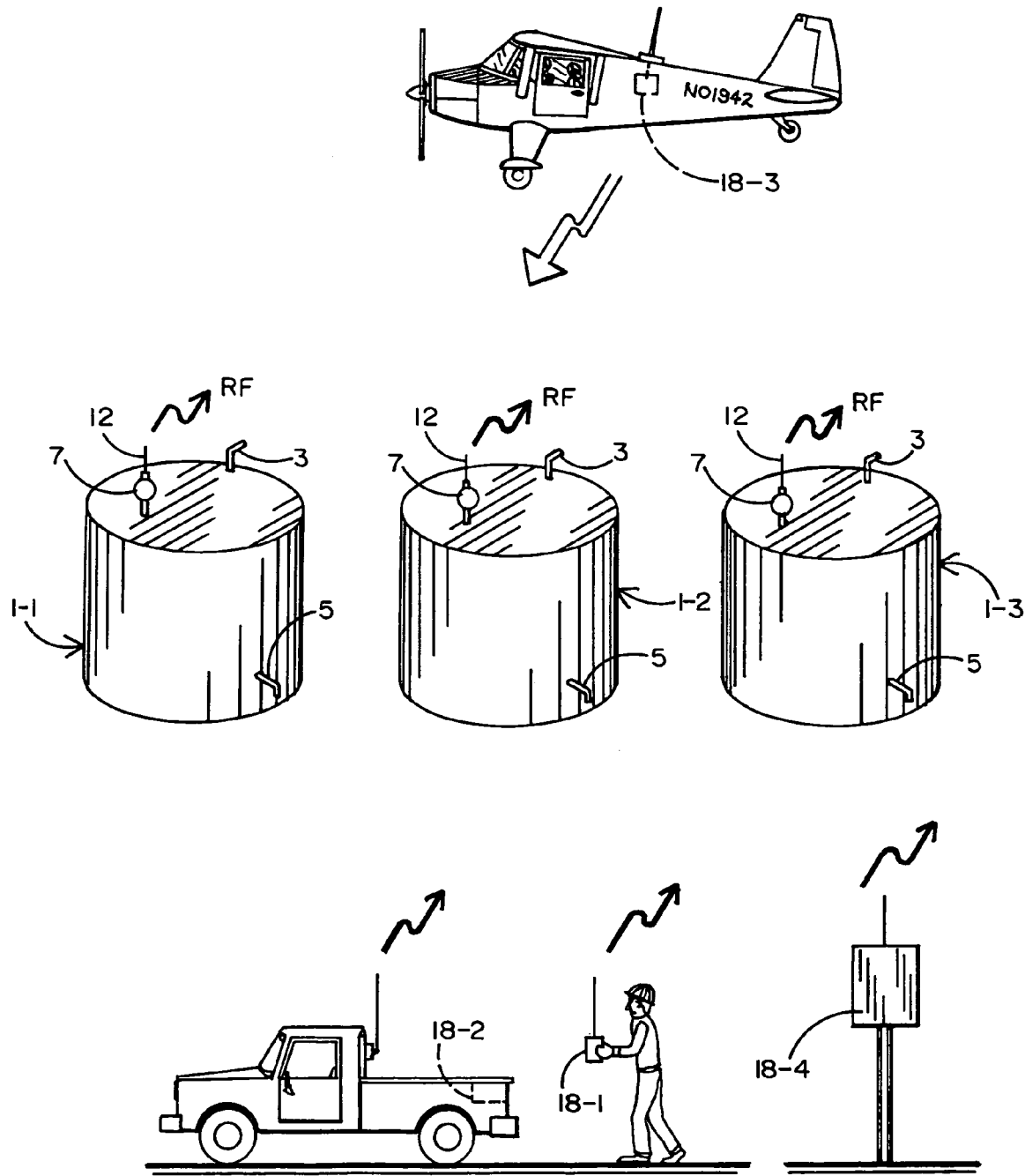
FIG. 2 illustrates a series of oil/water recovery tanks having respective ultrasonic oil/water level monitors for transmitting tank level data by wireless means to any one of a plurality of mobile or stationary data collectors or relays.

FIG. 2 of the drawings illustrates a plurality of storage tanks located in the field with each tank having a wireless fluid level monitor 7 mounted at the top of the tank. In this case, one of the tanks 1-1 contains oil, a second tank 1-2 contains water and yet another tank 1-3 functions as an overflow tank in the event that oil or water must be removed from one of the storage tanks 1-1 or 1-2 should the fluid level monitor 7 thereof detect an imminent overflow condition and a potential environmentally unfriendly oil spill. However, the contents of the tanks illustrated in FIG. 2 is not to be considered a limitation of this invention.

In the case of FIG. 2, any one or all of the storage tanks 1-1, 1-2 or 1-3 may communicate over a wireless data communication path between antenna 12 and the antenna of a remote mobile or stationary data collector or relay. Each remote data collector includes suitable memory in which data is stored for later evaluation and may be a hand-held device 18-1 that is carried by a field worker walking near the storage tanks, or a vehicle mounted device 18-2 transported by a motor vehicle driving past the storage tanks, or an aircraft mounted device 18-3 that is flown over the storage tanks. A fixed (e.g., pole mounted) data relay 18-4 is also contemplated to be accessed by cell phone dial-in, satellite, or the like. The data from relay 18-4 can be sent to other locations by modem, wide area networking, or a customer provided data interface. Such a fixed data relay 18-4 will be suitably spaced from the tanks 1-1 . . . 1-3 so as to lie outside the explosive environment which surrounds the tanks. Reference may be made to my U.S. Pat. No. 6,967,589 for details concerning the fixed data relay like that described herein.

Each of the fluid level monitors 7 atop the respective storage tanks 1-1 . . . 1-3 is provided with a unique digitally encoded identification number. The data collectors or relay 18-1 . . . 18-4 selectively interrogate the monitors 7 of the tanks so as to gain access to the data collected by each monitor, one at a time, depending upon the particular ID number being transmitted.

Figure 3:
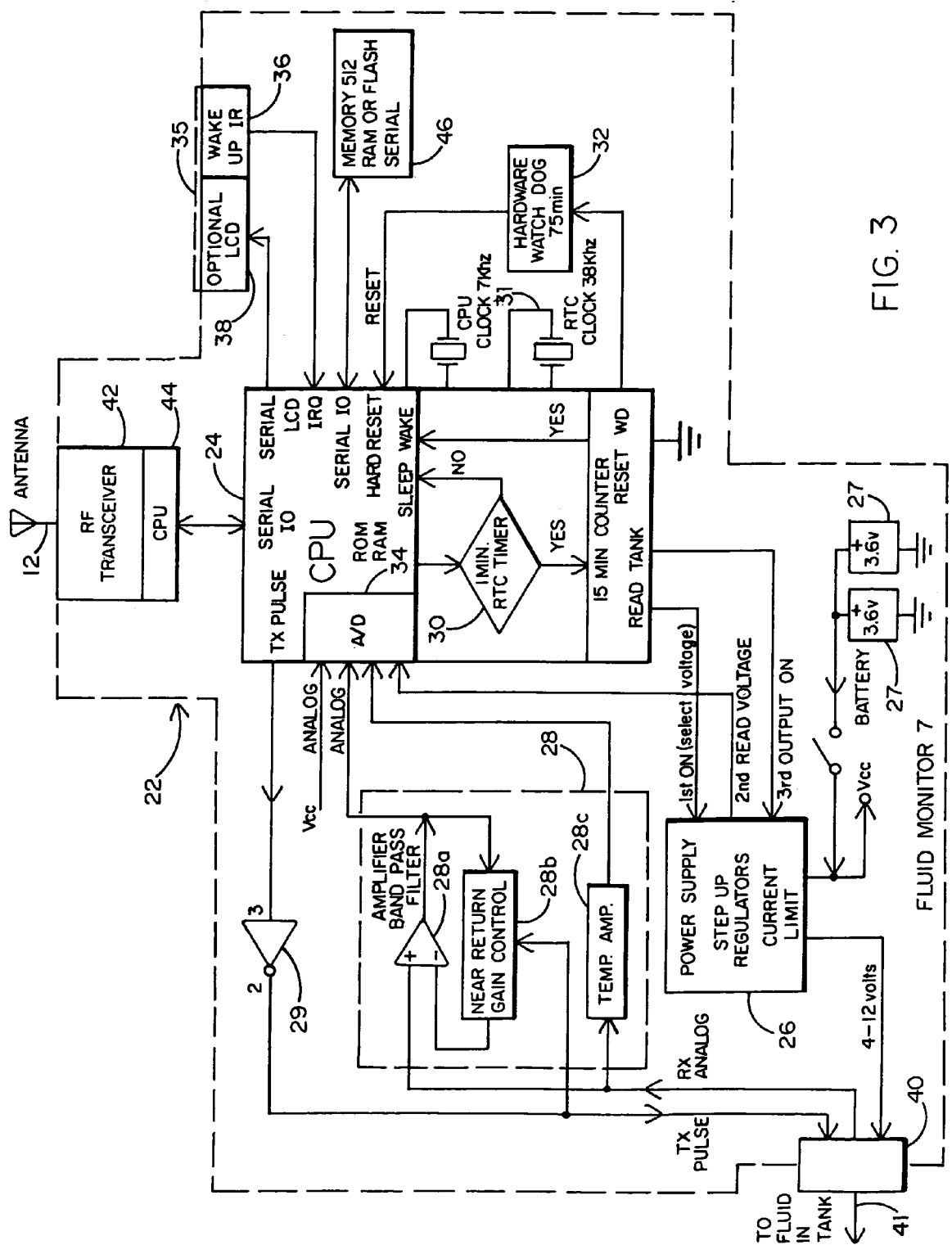
FIG. 3 is a block diagram showing a preferred embodiment of the ultrasonic oil/water level monitor of the present invention.

Turning now to FIG. 3 of the drawings, details of the wireless fluid level monitor 7 shown in FIGS. 1 and 2 are now provided. In order to enable the monitor 7 to survive in the harsh gas and oil well environment in which the data will be collected and transmitted, monitor 7 is advantageously surrounded by a gas tight and explosion proof rated casing 22 such as a Series XIHM casing manufactured by Adelet. The monitor 7 is controlled by a main CPU 24. By way of example, the main CPU 24 is a standard 16-bit microprocessor with programmable flash memory, internal RAM, a multi-port analog-to-digital (A/D) converter, and an internal oscillator, such as that manufactured by Texas Instruments under Part No. MSP430F.

The power supply 26 for monitor 7 is controlled by the main CPU 24. Power supply 26 is a low current (for safety), low power device which is normally in an inactive (i.e., sleep) mode except when tank level readings are to be taken. A DC input terminal of the power supply 26 is connected through an on-off switch to a pair of 3.6 volt lithium ion battery cells 27 that are arranged in electrical parallel to provide 36 amp hour capacity. The ultrasonic transducer 40 is powered by a step-up controllable voltage regulator of the power supply 26. The step-up voltage which is provided from an output terminal of the power supply 26 to the transducer 40 is controlled by the CPU 24 and preferably lies in a range of 4 to 12 volts DC which, with the pulse width, sets the output power of the ultrasonic transducer. The pulse width is also controlled by CPU 24.

An internal real time clock 30 with a 38.4 KHz crystal 31 will periodically enable (i.e., wake up) the main CPU 24 at certain predetermined (e.g., one hour) intervals. When the CPU 24 is enabled, a watch dog timer 32 is reset. The watch dog timer 32 is an independent low current, resetable (to one hour) counter which tracks CPU activity and is conditioned to reset the CPU 24 in the event that the CPU is not awakened by its own internal clock 30. Once awakened, the CPU 24 will check its instruction set, activate the power supply 26 so that voltage is supplied to transducer 40, and switch on the A/D converter 34 which is connected to output terminals of the ultrasonic transceiver 28 by which analog signals indicative of fluid level that are produced by the ultrasonic transducer 40 are supplied to A/D converter 34 to be digitized for analysis by CPU 24.

The main CPU 24 is periodically awakened by its internal clock 30 to determine if a potential overflow condition exists within the tank and whether an alarm signal should be generated. That is, if the oil level or the rate of fill within the tank exceeds predetermined and preprogrammed limits, the CPU 24 will initiate an alarm signal. The alarm signal is transmitted with the particular ID of the fluid level monitor 7 to the fixed data relay 18-4 of FIG. 2. The alarm signal is then sent from data relay 18-4 to a remote station until an acknowledgement is received. In the case where a fixed data relay 18-4 is not located in the vicinity of the fluid level monitor 7 or the main CPU 24 is only programmed to communicate with one of the walk-by, drive-by, or fly-by data collectors 18-1, 18-2 and 18-3 of FIG. 2, then the alarm condition and the time of the event are stored in the CPU 24 until the fluid level monitor 7 is selectively interrogated in the manner previously described.

The main CPU 24 is provided with an optional wake up means to be used in substitution of its internal real time clock 30. As previously described, internal clock 30 enables the CPU 24 to wake up at regular predetermined time intervals to check for potential overflow conditions. The optional wake up means allows technicians to enable the CPU 24 to wake up at any time when it is desirable to take a fluid level reading on an as-needed basis. To accomplish the foregoing, the gas-tight explosion-proof casing 22 is provided with a sealed transparent (e.g., thick Pyrex) front panel 35 behind which is located an infrared sensor 36. The sensor 36 is responsive to a sudden temperature change such as that which will occur when the technician passes his uncovered hand in front of the transparent front panel 35. The sensor 36 is connected to the CPU 24 to initiate a contemporaneous fluid level reading, the results of which are displayed on a liquid crystal or similar display 38 located behind the transparent front panel 35.

The ultrasonic transducer 40 has an acoustic axis 41 which extends vertically downward from the exterior of the monitor casing 22 at the top of the oil tank (designated 1 in FIG. 1) towards the tank bottom. A suitable ultrasonic transducer for use in taking fluid level readings is that which includes a piezoelectric transducer element, a receiver pre-amp, and a drive oscillator. The transducer 40 preferably operates at a frequency of 59 KHz. Because it will be exposed to the corrosive environment of the oil tank, the transducer 40 is preferably sealed in Teflon and surrounded by a non-conductive protective housing.

Referring briefly in this regard to FIGS. 4 and 5 of the drawings, there is shown in FIG. 4 the protective housing 50 in which the ultrasonic transducer 40 will be received and encased so as to be protected from the corrosive environment of the oil tank 1. The housing 50 is machined with a (e.g., three inch) pipe thread 51 which is to be mated to a correspondingly threaded fitting (designated 8 in FIG. 1) at the top of the oil tank shown in FIG. 1. A threaded coupler 66 extends from the housing 50 to be mated to the gas-tight, explosion-proof casing 22 that surrounds the fluid level monitor 7. By way of example, the protective housing 50 is manufactured from a non-metallic acetal resin material known commercially as Delrin that is available from Dupont Corporation.

A cylindrical cavity 52 is formed at the front of the housing 50 in which to slidably receive the ultrasonic transducer (designated 40 in FIGS. 3 and 5). A pair of (e.g., Viton) O-rings (only one of which 54 being shown) extend around the cavity 52 to seal the transducer 40 therewithin. A longitudinally extending channel 56 communicates with cavity 52 to enable a set of five electrical wires to run from the transducer to a connector 58. In the assembled relationship of FIG. 3, the transducer 40 is coupled to the ultrasonic transceiver 28 of the fluid level monitor 7 by way of connector 58. The wire set running through channel 56 to connector 58 is surrounded by a cable sleeve 60, and the cable sleeve 60 is embedded within channel 56 that is backfilled with a suitable encapsulant 62, such as epoxy, or the like.

FIG. 5 of the drawings illustrates details of the 5-wire ultrasonic transducer 40 that was previously described while referring to FIG. 3. The transducer 40 is sized and (e.g., cylindrically) shaped so as to be slidably received within the cylindrical cavity 52 formed in the protective housing 50 of FIG. 4. By way of example, the transducer 40 is approximately 2 inches long with a diameter of approximately 2 inches, an operating temperature range of −10 degrees C. to +70 degrees C., an Rx gain of 30 db and a Tx pulse power of 4 volts to 15 volts DC (at 50 ma max peak). A pair of circumferentially extending grooves 64 surround the Teflon covered transducer 40 in which to receive the (Viton) O-rings 54 that are carried by the transducer housing 50 of FIG. 4 so that the transducer will be held, aligned and sealed within cavity 52 and the acoustic axis 41 thereof will be directed vertically downward from the top of the tank towards the fluid to be measured.

Returning now to the details of the fluid level monitor 7 shown in FIG. 3, by programming the main CPU 24 with the dimensions of the oil tank, information can be gathered regarding the level of oil within the tank, the volume of the oil within the tank, the rate at which the tank is being filled with oil, whether the tank is approaching full capacity and is, therefore, in need of being partially emptied to avoid spillage (whereby the aforementioned alarm signal may be generated), and, correspondingly, the production efficiency of the associated oil well. The gathered information is supplied as a stream of digital data from a serial 110 terminal of the main CPU 24 to an RF transceiver 42 to be broadcast via antenna 12 over the aforementioned wireless communication path to one of the data collectors or data relay illustrated in FIG. 2.

The RF transceiver 42 is a low power ISM transceiver using DSSS modulation for sending and receiving data at 38.4 Kbits. The RF transceiver 42 has a self-contained CPU 44 which is independent of the main CPU 24 and is periodically enabled from a sleep (i.e., inactive) state by its own internal real time clock to determine whether receiver 42 is being selectively accessed (i.e., polled) for data by one of the remote data collectors or data relay 18-1 ... 18-4 shown in FIG. 2. That is, and as was previously disclosed when referring to FIG. 2, each fluid level monitor 7 in a system of monitors at respective oil tanks 1-1 ... 1-3 may be assigned a particular ID number.

If the monitor 7 receives appropriate ID and command signals transmitted to its antenna 12 from any one of the walk-by, drive-by, fly-by, or fixed data collectors or data relay (designated 18-1 ... 18-4 in FIG. 2) that are located outside the explosive environment of the tank, the CPU 44 of transceiver 42 will wake up the main CPU 24 of monitor 7 and input the commands thereto via the serial I/O terminal. By way of example, the CPU 44 of RF transceiver 42 may be identical to the main CPU 24 of monitor 7. Once it is awakened, the main CPU 24 causes the ultrasonic transducer 40 to take an oil level reading within the tank.

An analog representation of the oil level readings taken by transducer 40 is supplied to the ultrasonic transceiver 28 to be applied to the A/D converter 34 of the main CPU 24. Digital data concerning the oil level readings is sent from the main CPU 24 to the CPU 44 of RF transceiver 42 to be transmitted over a wireless communication path from antenna 12 back to the remote data collector or relay to be retransmitted or relayed for evaluation. In the case where the CPU 44 of RF transceiver 42 does not detect a polling ID signal, it will return to its inactive state and the main CPU 24 remains asleep.

The RF transceiver 42 is preferably a commercially available Xemics RF integrated circuit which utilizes a 902/925 MHz ISM band. Modulation in this case will be broadband (500 KHz) FSK. Power output is limited to 16 mw to avoid a potentially explosive incident. The antenna 12 of wireless monitor 7 is preferably a ⅝ wave vertical antenna with an SMA type connector. The gain of antenna 12 is +5.5 db. As with the case of the ultrasonic transducer 40, the antenna 12 is sealed in a non-conductive protective covering manufactured from Teflon.

A variable gain amplifier (i.e., bandpass filter) 28a of the ultrasonic transceiver 28 is connected between an out terminal of the ultrasonic transducer 40 and the A/D converter 34 of the main CPU 24. Amplifier 28a receives raw analog signals from the ultrasonic transducer 40 which are indicative of the time of flight between an incident acoustic signal transmitted by the transducer towards the oil in the tank and a return signal reflected to the transmitter from the surface of the oil. The raw analog signals supplied by the ultrasonic transducer 40 are conditioned and filtered by the amplifier (bandpass filter) 28a to be provided to the A/D converter 34 of the main CPU where the analog data is digitized and analyzed. By programming the main CPU 24 with the dimensions of the tank in which the measurement is to be taken, the level of the oil within the tank (and other useful information as earlier described) can be calculated depending upon the time of flight between the incident and return signals. The digitized tank level data is then stored within the internal RAM of CPU 24. In this manner, the tank level measurement can be repeated and compared with previously collected measurement data that is stored in the internal RAM so as to ensure the consistency of the measurements and the reliability of the data to be ultimately transmitted from the antenna 12 of RF transceiver 42. An optional external RAM or flash memory 46 may be connected to the main CPU 24 in which the digitized tank level data can be stored for later recall and evaluation.

The ultrasonic transducer 40 is pulse width controlled through a Tx pulse inverter 29 connected to a Tx pulse output terminal of the main CPU 24. The ultrasonic transducer 40 responds to the CPU by providing its 59 KHz transmitted output at the selected power. The variable gain amplifier 28a has a gain of X 4.5 and a high cutoff of approximately 100 KHz. The gain of the amplifier 28a is controlled by the Tx pulse output of the main CPU 24 and a near gain control 28b of ultrasonic transceiver 28. The gain is initially lowered to X 1 for approximately 2 ms and then ramped up to X 4.5 in three ms by control 28b. This action prevents over-driving the amplifier 28a and missing short range ultrasonic returns in the range of 12 inches to 24 inches where the level of oil is close to the top of the tank in which the fluid level monitor 7 is mounted.

The ultrasonic transceiver 28 also includes a temperature amplifier 28c that is connected between the ultrasonic transducer 40 and the A/D converter 34 of the main CPU. Temperature amplifier 28c generates a DC voltage that is indicative of the temperature at the face of transducer 40 at the top of the tank in which a level measurement is to be taken. The temperature information is read by CPU 24 and used during its calculation of oil level. That is, by calibrating the DC bias voltage on transducer 40, a linear temperature value is read by the CPU 24 and used to adjust the time of flight of the acoustic signal transmitted and received by the transducer.

Figure 6:
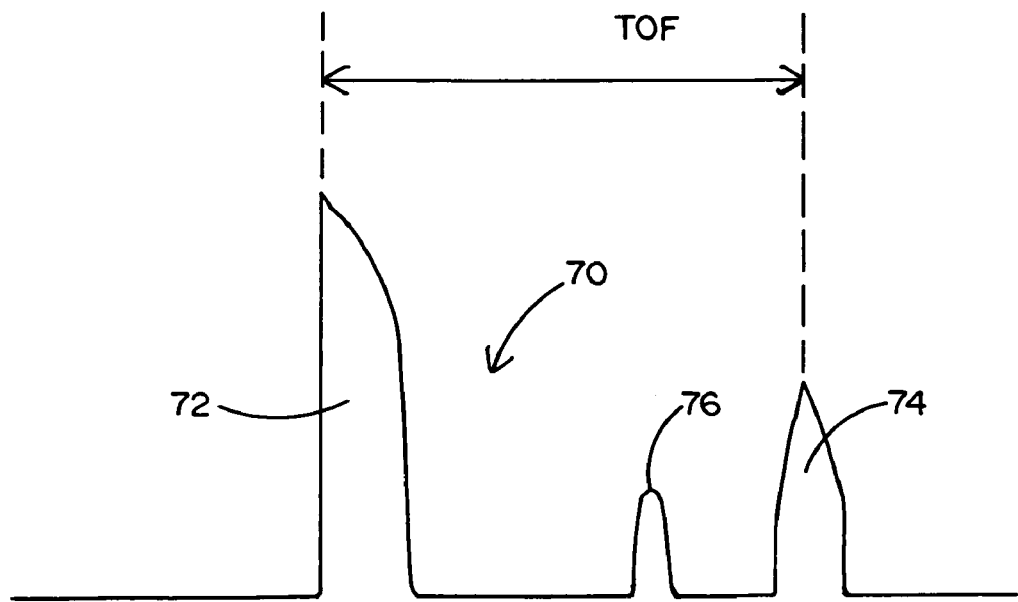
FIG. 6 is illustrative of the analog signal transmitted by and returned to the ultrasonic transducer and including incident, reflected and calibration pulses.

FIG. 6 of the drawings illustrates an analog signal 70 that is produced by the ultrasonic transducer 40 and supplied to the A/D converter 34 of the main CPU 24 after the signal is conditioned and filtered by the amplifier/filter 28a of the ultrasonic transceiver 28 of fluid monitor 7 of FIG. 3. The data collected by the main CPU 24 is the analog signal 70 bit sliced by the A/D converter 34 at a 16 µsecond sample rate. The A/D converter 34 is preferably a 12 bit device such that 3.2K bytes of data are stored in the internal CPU RAM for analysis for each level measurement. The analog signal includes an incident pulse 72 that is indicative of the acoustic signal transmitted by ultrasonic transducer 40 towards the surface of the oil within the tank and a reflected pulse 74 that is returned to the transducer 40 from the surface of the oil. The elapsed time of flight (designated TOF) between the peaks of the incident and reflected pulses 72 and 74 represents the time of transit of the acoustic signal 70 from its transmission by the ultrasonic transducer 40 to its receipt by transducer 40 after reflection off the surface of the oil. Since the time of flight represents a round trip from and to the ultrasonic transducer 40, the main CPU 24 divides the elapsed time calculation in half and uses the resulting time to calculate the distance form the face of transducer 40 to the surface of the oil.

The analog signal 70 of FIG. 6 also includes an echo pulse 76 between the incident and reflected pulses 72 and 74. For purposes of convenience, the analog signal 70 is shown with a single echo pulse 76. However, as will soon be explained, depending upon the length of the reference rod (designated 14 in FIG. 1) and the number of reflectors 16 carried thereby, the analog signal 70 of FIG. 6 may include two or more echo pulses.

Figure 7:
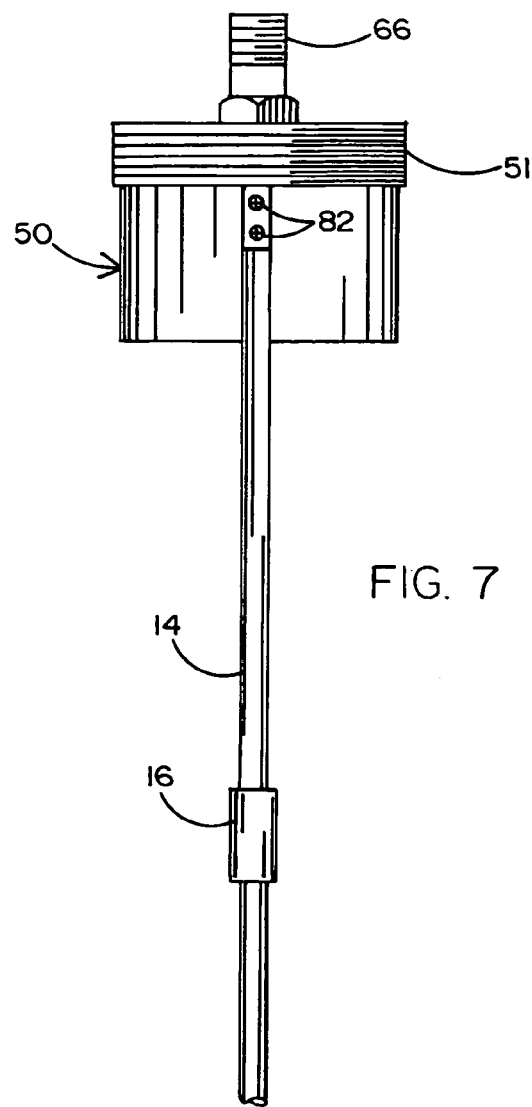
FIGS. 7 and 8 show a reference rod having one or more acoustic reflectors by which to calibrate and improve the accuracy of the oil/water level monitor.
Figure 8:
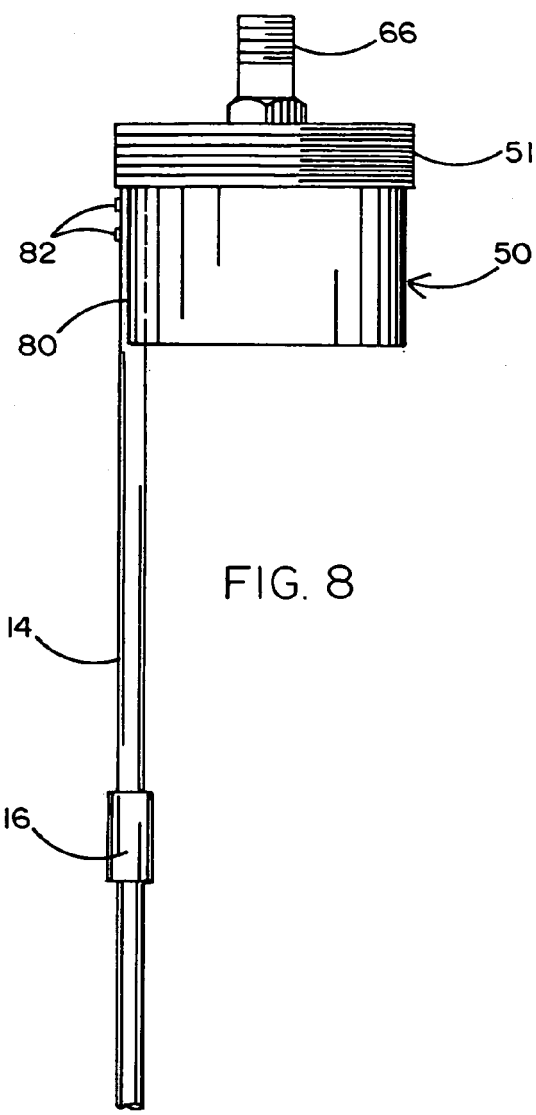

Referring in this regard to FIGS. 7 and 8 of the drawings, there is shown the reference rod 14 according to a preferred embodiment affixed to the outside of the protective housing 50 within which the ultrasonic transducer 40 of FIG. 5 is encased. The reference rod 14 is located within an axially extending slot (designated 80 in FIG. 8) and affixed in place therein by means of screws 82, or the like. The reference rod 14 projects from housing 50 past the face of the transducer so as to extend downwardly from the top of the tank towards the surface of the oil to be monitored. As was previously indicated, the reference rod 14 advantageously permits the oil level readings to be calibrated for accuracy by taking into account environmental conditions (e.g., vapors above the oil, changes in temperature, pressure, etc.) within the tank.

The reference rod 14 has reference marks (i.e., acoustic reflectors 16) that are located at predetermined fixed distances below the face of the ultrasonic transducer. By way of example, the reflectors 16 are located at uniform four foot intervals along the reference rod 14. The reference rod 14 is preferably a ¼-⅜ inch diameter tube that is manufactured from Teflon or any other material that is capable of withstanding the harsh (gaseous and acidic) conditions within the tank. Reference rod 14 has different lengths having different numbers of reflectors for use in tanks of different height. A short tank may require a reference rod with only a single length and a single reflector. Taller tanks will typically require two or more lengths and a corresponding number of reflectors.

Figure 9:
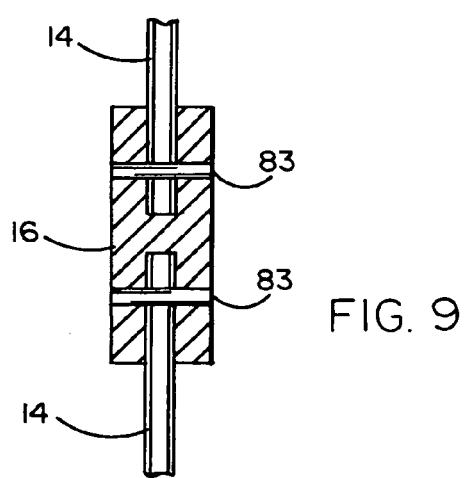
FIG. 9 is a cross section of an acoustic reflector connected to the reference rod of FIGS. 7 and 8.

Each reflector 16 that is carried by the reference rod 14 is manufactured from a material (e.g., stainless steel) that, when located within the narrow ultrasonic beam (designated 10 in FIG. 1), is adapted to reflect an echo signal back to the ultrasonic transducer within the protective housing 50. This echo signal is represented by the echo pulse 74 as part of the analog signal 70 of FIG. 6. The single echo pulse 74 shown in FIG. 6 is indicative of a relatively short reference rod having a single acoustic reflector. Each reflector 16 is preferably a cylindrical weight that is sized so as to prevent any loss of the analog signal that is reflected off the surface of the oil and returned to the ultrasonic transducer 40. By way of example, the reflector 16 has a length of 2 ½ inches and a diameter of 0.75 inches. As is best shown in FIG. 9 of the drawings, each reflector 16 is connected to opposing lengths of the reference rod 14 by means of stainless steel roll pins 83 or any other suitable fastener.

When it is awakened to take a fluid level measurement, the main CPU 24 of the fluid level monitor 7 of FIG. 3 decodes the reference readings (i.e., the echo pulse or pulses 76 contained in the analog signal 70 of FIG. 6) and makes corrections for errors in the oil level measurement introduced by the tank environment. More particularly, the main CPU 24 is initially programmed with the height and diameter of the tank and the number of and distance between the reflectors 16 that are connected to the reference rod 14. As previously described, the reflector 16 of the reference rod 14 shown in FIGS. 7 and 8 is known to be located a precise distance (e.g., four feet) below the face of the ultrasonic transducer that is encased by housing 50. The CPU 24 calculates the measured distance of the reflector below the transducer based upon (one half) the elapsed round trip time between the incident pulse 72 of the analog signal 70 generated by the ultrasonic transducer and the echo pulse 76 that is reflected off the reflector 16 and returned to the transducer 40.

Depending upon whether the measured distance calculated by CPU 24 is less than or greater than the true distance of four feet and the amount of such difference, the CPU 24 will make corresponding compensations to the time of flight (TOF) between the incident pulse 72 transmitted by the transducer 40 and the reflected pulse 74 returned to the transducer from the surface of the oil. At the same time, the CPU 24 will use the reflected echo pulse 74 to adjust the power being supplied from the power supply 26 of the fluid level monitor 7 of FIG. 3 to the ultrasonic transducer 40.

In the case where more than a single reflector 16 is connected to the reference rod 14, a calibration table may be compiled as each successive reflector is covered by the rising oil. This table may be updated continuously to adjust for changing tank conditions and fluid levels.

Figure 10A:
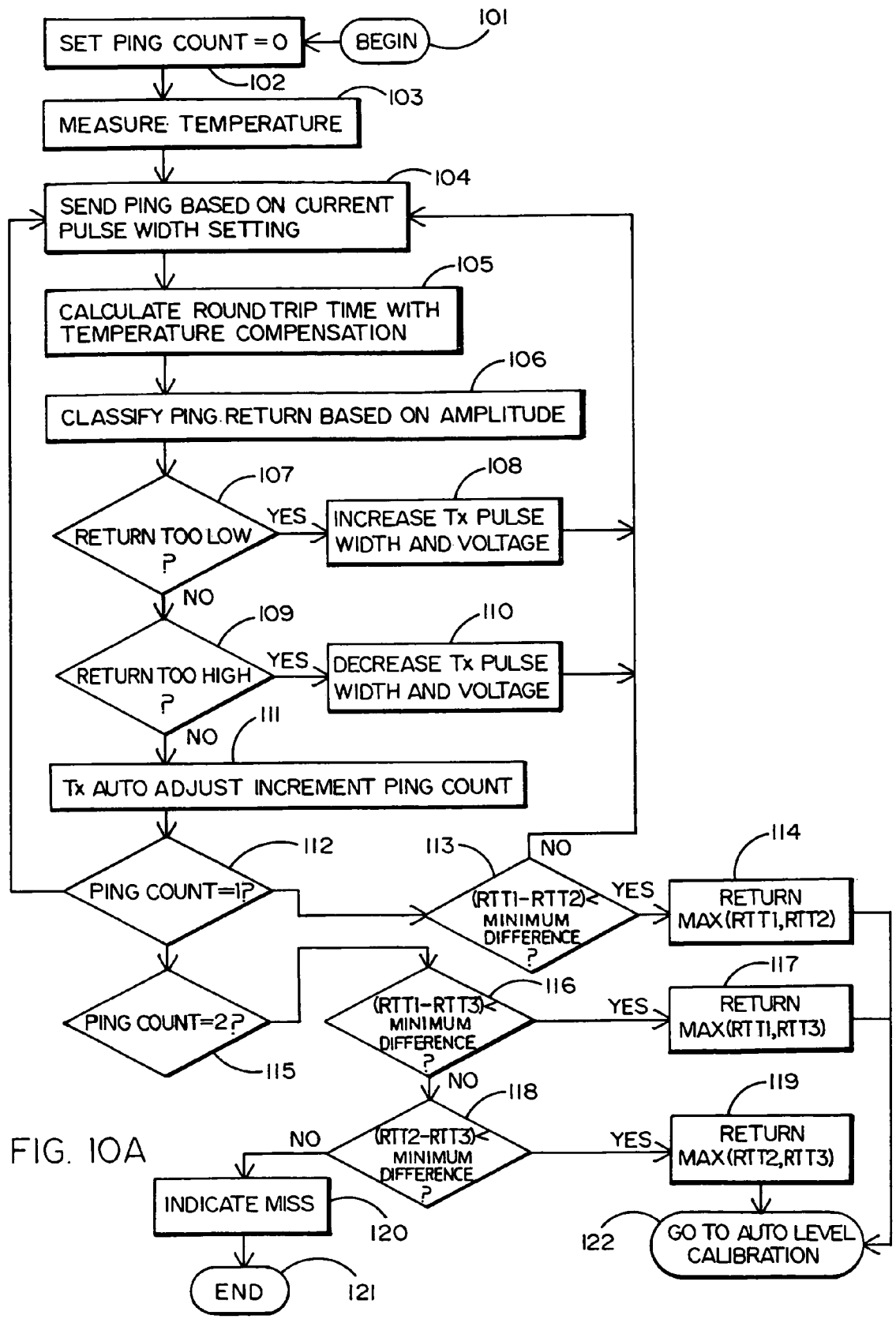
FIGS. 10A and 10B are flow diagrams by which to illustrate the steps for monitoring the level of oil/water and deriving data which is an accurate representation thereof.
Figure 10B:
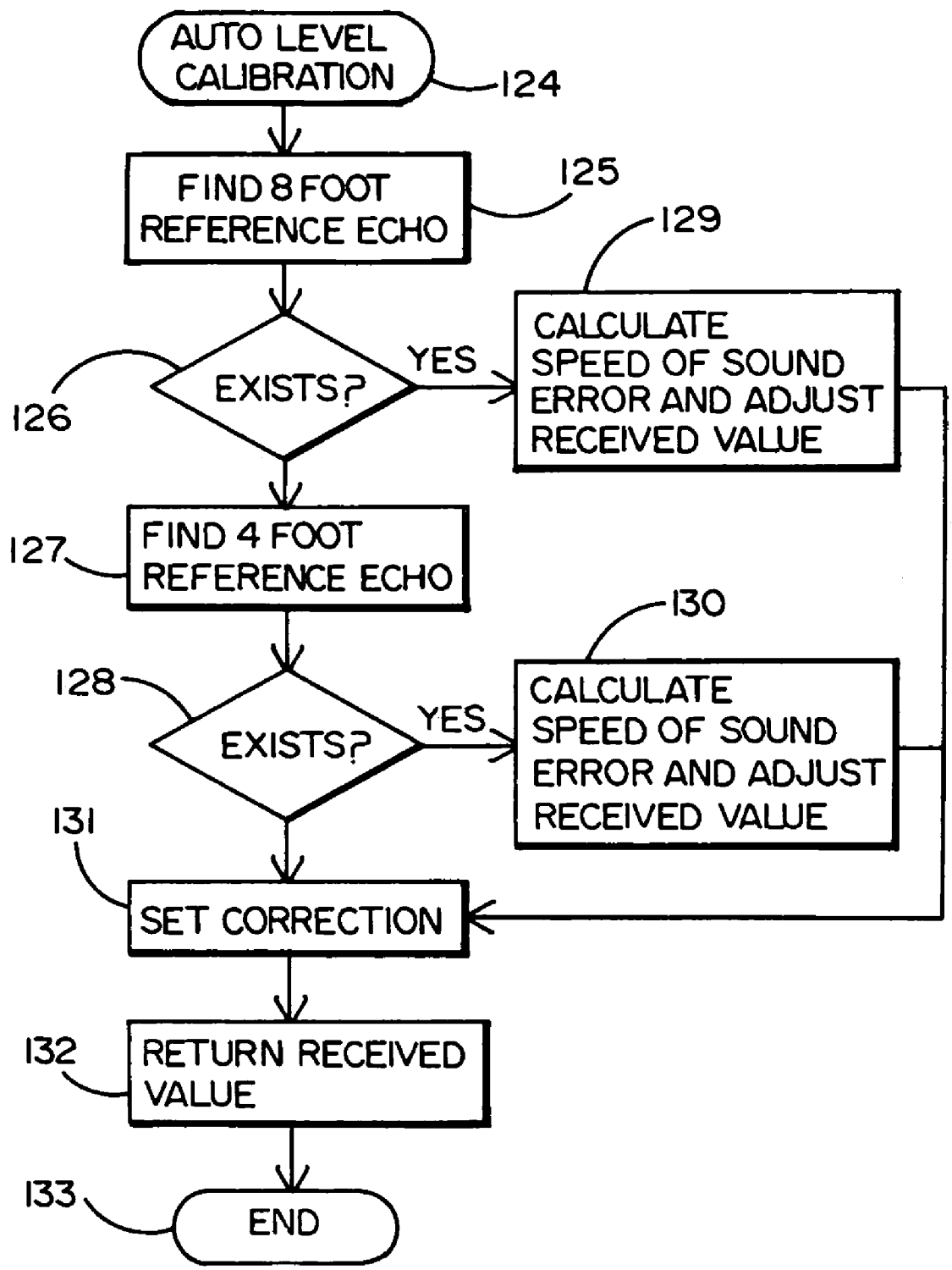

Turning now to FIG. 10A of the drawings, there is shown a flow diagram to illustrate the steps by which the fluid level monitor 7 shown in FIG. 3 takes fluid level measurements and transmits digital data to provide an accurate indication thereof. Initially (101), the main CPU 24 is awakened. This may occur when a particular ID polling signal is received at the antenna 12 of RF transceiver 42 to request access to the data compiled by monitor 7. The ping count (102) is set to 0 in the main CPU 24. In the present example, three different fluid level measurements will be taken by the ultrasonic transducer 41, and, following analysis by the main CPU 24, digital representations thereof are stored in the internal CPU RAM for comparison. The ping count is updated for each successive measurement. For purposes of reliability, at least two of the fluid level measurements must be within a predetermined tolerance before output data is supplied by CPU 24 at the I/O terminal thereof for transmission via antenna 12.

The temperature is measured (103) at the face of the ultrasonic transducer 40, and an indication thereof is provided to the main CPU 24 by way of the temperature amplifier 28c of the ultrasonic transceiver 28. The Tx pulse width and the voltage supplied to the ultrasonic transducer are set (104) by CPU 24 to control the output power of transducer 40 via Tx pulse inverter 29 so that the analog signal (designated 70 in FIG. 6) can be detected and analyzed. The time of flight (TOF) is then calculated (105) between the incident and return pulses (designated 72 and 74 in FIG. 6) of the analog signal 70 with compensation for the temperature provided via amplifier 28c. The return pulse 74 of the analog signal 70 is classified (106) as being either too high or too low. The return pulse 74 should preferably have a height corresponding to approximately 1 volt so as not to overdrive the amplifier 28a of ultrasonic transceiver 28. If the voltage associated with the return pulse 74 is too low (107), then the Tx pulse width from main CPU 24 and the voltage provided to the ultrasonic transducer 40 from power supply 26 are increased (108). However, if the voltage associated with the return pulse 74 is otherwise too high (109), then the Tx pulse width and the output voltage from power supply 26 are decreased (110).

The ping count maintained by CPU 24 is then increased (111) from 0 to 1 or from 1 to 2. A ping count of 2 indicates that three fluid level measurements have been taken (i.e., at ping counts=0, 1 and 2). Therefore, if the ping count is only 0 (112), the process returns to step 104 so that additional fluid level measurements can be taken. If the ping count has otherwise reached 1 (112), then the CPU 24 makes a comparison (113) of the fluid level measurement data stored in the internal CPU RAM during the first and second measurements (i.e., ping counts=0 and 1). If the comparison is out of a predetermined tolerance, the data is deemed unreliable and the method returns to step 104. If the comparison is within tolerance, the first and second fluid level measurement data is preserved (114).

In the case where the ping count has reached 2 (115) indicating the third of the three fluid level measurements, the CPU 24 makes a comparison (116) of the fluid level measurement data during the first and third measurements. If this comparison is not out of predetermined tolerance, the first and third fluid level measurement data is preserved (117). Next, the CPU 24 makes a comparison (118) of the fluid level measurement data during the second and third measurements. If this comparison is not out of predetermined tolerance, then the second and third fluid level measurement data is preserved (119).

It may be found that all of the comparisons between the first and second, first and third, and second and third fluid level measurement data are out of tolerance, such that none of the fluid level information collected by the ultrasonic transducer 40 and stored within the internal CPU RAM can be relied upon as accurate. In this case, an error (i.e., miss) indication is generated (120) and the method is ended (121) until a new set of three fluid level readings are taken, stored and compared in the manner described above. However, where at least two of the three fluid level readings are within tolerance relative to one another, then the corresponding data (114, 117, 119) is used (122) to account for the hostile environment within the fluid tank which is known to introduce errors into the time of flight computations made by the main CPU 24.

Referring in this regard to FIG. 10A and to the beginning of the fluid level calibration (124), it should be remembered that the reference rod (designated 14 in FIGS. 7 and 8) carries one or more acoustic reflectors 16 at predetermined fixed (e.g., four foot) intervals therealong so as to lie within the ultrasonic beam generated by the ultrasonic transducer 40. Each reflector returns an echo pulse (designated 76 in FIG. 6) to the transducer 40. Accordingly, the first step (125) is to determine if an echo pulse has been returned from any reflector that is carried by the reference rod 14 which lies eight feet from the transducer 40. In the example of FIG. 6, only a single reflector 16 is located four feet from the transducer.

Following a determination (126) that there is no reflector at eight feet (or more) along the reference rod 14 and, therefore, no echo pulse has been returned therefrom, a determination is made (127) whether a reflector 16 is located on reference rod 14 four feet from the ultrasonic transducer. In the event that it is determined (128) that a reflector is located four feet along the reference rod 14, or if it was previously determined (126) that there was a reflector at the eight foot reference mark, the time of flight is computed by the main CPU 24 between the incident pulse (72 in FIG. 6) generated by the ultrasonic transducer 40 and the echo pulse 76 returned from each reflector 16. The time of flight is converted into distance and compared (129, 130) with the known four and eight foot distances at which the reflectors are located along the reference rod 14. Depending upon whether the computed time of flight is greater or less than four (or eight) feet, the main CPU 24 makes a corresponding adjustment (i.e., correction 131) to the time of flight (TOF) between the incident and return pulses (72 and 74 in FIG. 6) which is indicative of the time required for an acoustic signal to be transmitted from transducer 40 to the surface of the fluid within the tank and reflected off the surface and returned to the transducer. The corrected time of flight is converted (132) into an accurate distance between the ultrasonic transducer 40 and the level of the fluid to be measured within the tank.

The calibration method is now ended (133) and, as previously disclosed, the main CPU 24 sends reliable fluid level data to the RF transceiver 42 from which such data is transmitted by antenna 12 over a wireless communication path. It may be appreciated that the data can be automatically transmitted in response to a particular ID polling signal at high speed and over long distances without the use of wires or requiring the presence of a field worker to make manual measurements. Moreover, the accuracy of the data is greatly enhanced relative to conventional fluid level measurement techniques.

Although the fluid level monitor herein disclosed has particular application for detecting the level of oil or water in a storage tank, it should be recognized that the monitor can effectively be used to detect the levels of different fluids including, but not limited to, other petroleum products, chemicals, hazardous liquids, liquid waste, etc.

The invention claimed is:

1. An ultrasonic monitor to measure the level of a fluid in a tank and comprising:

an ultrasonic transducer adapted to generate an incident acoustic signal towards the surface of the fluid within the tank and to receive a return signal reflected off the surface of the fluid;

a main central processing unit (CPU) being responsive to the incident and return signals generated by and reflected to the ultrasonic transducer for determining the elapsed time of flight therebetween and calculating the distance from the surface of the fluid to the ultrasonic transducer depending upon said elapsed time of flight;

means to adjust the elapsed time of flight determined by the main CPU to compensate for errors introduced by the environment within the tank, whereby to maximize the accuracy of the distance calculated by the main CPU;

an RF transceiver having an antenna and being interfaced with said main CPU for receiving data therefrom corresponding to the distance calculated by said main CPU, the antenna of said RF transceiver transmitting said distance data over a wireless communication path, said RF transceiver including a transceiver CPU responsive to a particular ID polling signal transmitted to the antenna of said RF transceiver when it is desirable to access the data corresponding to the distance calculated by said main CPU, said transceiver CPU supplying a wake-up signal to said main CPU for causing said ultrasonic transducer to generate said incident acoustic signal towards the surface of the fluid within the tank and the resulting data which is indicative of the distance calculated by the main CPU to be supplied to said transceiver CPU for transmission by said antenna;

an infrared sensor interfaced with said main CPU;

a gas-tight, explosion-proof casing enclosing at least some of each of said ultrasonic transducer, said main CPU, said RE transceiver, and said infrared sensor; and a transparent panel located in said gas-tight, explosion-proof casing, said infrared sensor positioned behind said transparent panel and responsive to a change in infrared energy applied through said transparent panel for supplying a corresponding wake-up signal to the main CPU, said main CPU being responsive to said wake-up signal for causing said ultrasonic transducer to generate said incident acoustic signal towards the surface of the fluid within the tank.

2. The ultrasonic monitor recited in claim 1, wherein the means to adjust the elapsed time of flight includes at least ultrasonic reflector located within the tank a known distance from the ultrasonic transducer so as to lie within the path of the incident acoustic signal and reflect an echo signal to said ultrasonic transducer, said main CPU being responsive to said echo signal to determine the elapsed time of flight between said incident and said echo signals for computing the distance between said ultrasonic transducer and said reflector and comparing the computed distance with the known distance.

3. The ultrasonic monitor recited in claim 2, wherein the means to adjust the elapsed time of flight also includes a reference rod extending into the tank from said ultrasonic transducer, said at least one ultrasonic reflector connected to said reference rod at the said known distance from said ultrasonic transducer.

4. The ultrasonic monitor recited in claim 3, wherein said ultrasonic transducer is surrounded by a protective housing, said reference rod connected to said protective housing and extending therefrom towards the surface of the fluid to be measured.

5. The ultrasonic monitor recited in claim 1, wherein said ultrasonic transducer is coupled to the top of the tank and adapted to generate a narrow ultrasonic beam downwardly from the top of the tank towards the surface of the fluid to be measured, said narrow ultrasonic beam making an angle of approximately 10 degrees.

6. The ultrasonic monitor recited in claim 1, further comprising a display located behind the transparent panel of said gas-tight, explosion-proof casing and interfaced with said main CPU, said display providing a visual indication of the distance from the surface of the liquid within the tank to said ultrasonic transducer calculated by said main CPU in response to the infrared energy signal applied to said infrared sensor.

7. The ultrasonic monitor recited in claim 1, wherein said main CPU includes an internal clock that is set to generate wake-up signals at predetermined time intervals, said main CPU responsive to said wake-up signals for causing said ultrasonic transducer to generate said incident acoustic signal towards the surface of the fluid within the tank so that a potential fluid overflow condition within the tank is detected on a regular basis.

8. The ultrasonic monitor recited in claim 1, further comprising a power supply interfaced with and controlled by said main CPU, said power supply including a step-up regulator connected to control the output power of said ultrasonic transducer.

9. The ultrasonic monitor recited in claim 8, further comprising battery means connected to said power supply for supplying a DC input voltage thereto.

10. The ultrasonic monitor recited in claim 1, wherein said main CPU includes an internal memory for storing therewithin a plurality of successive distances calculated by said main CPU, said main CPU comparing the plurality of distances stored in said internal memory and identifying a particular reliable distance calculation depending upon the similarities to one another of said distance calculations stored within said internal memory.

11. The ultrasonic monitor recited in claim 1, further comprising an ultrasonic transceiver connected to receive an analog representation of the incident and return signals generated by and reflected to said ultrasonic transducer, said main CPU having an analog-to-digital converter connected to said ultrasonic transceiver to receive said analog representation therefrom in a condition to be digitized, whereby to enable said main CPU to determine the elapsed time of flight between said incident and reflected signals and thereby calculate the distance from the surface of the liquid within the tank to said ultrasonic transducer.

12. The ultrasonic transducer monitor recited in claim 11, wherein said ultrasonic transceiver includes a variable gain amplifier connected between said ultrasonic transducer and the analog-to-digital converter of said main CPU, the analog representation of said incident and return signals being filtered and applied to said analog-to-digital converter by way of said variable gain amplifier.

13. The ultrasonic monitor recited in claim 11, wherein said ultrasonic transceiver includes a temperature amplifier connected between said ultrasonic transducer and the analog-to-digital converter of said main CPU, an indication of the temperature within the tank at said ultrasonic transducer being applied to said analog-to-digital converter by way of said temperature amplifier.

14. The ultrasonic monitor recited in claim 1, further comprising a pulse inverter connected between a pulse output of the main CPU and said ultrasonic transducer, the width of pulses supplied from said pulse output to said ultrasonic transducer by way of said pulse inverter controlling the output power of said ultrasonic transducer.

15. An ultrasonic monitor to measure the level of a fluid in a tank having an existing threaded fitting at the top thereof, said ultrasonic monitor comprising:

an ultrasonic transducer adapted to generate an incident acoustic signal towards the surface of the fluid within the tank and to receive a return signal reflected off the surface of the fluid;

a central processing unit (CPU) being responsive to the incident and return signals generated by and reflected to the ultrasonic transducer for determining the elapsed time of flight therebetween and calculating the distance from the surface of the liquid to the ultrasonic transducer depending upon said elapsed time of flight;

an RF transceiver having an antenna and being interfaced with said CPU for receiving data therefrom corresponding to the distance calculated by said CPU, said antenna transmitting said distance data over a wireless communication path; and a gas-tight casing enclosing at least some of said ultrasonic monitor, wherein said ultrasonic transducer is encased within a protective non-metallic housing, said protective housing having a set of pipe threads to be coupled to the existing threaded fitting at the top of the tank and a threaded coupler to be mated to said gas tight casing such that said ultrasonic transducer has an acoustic axis directed downwardly towards the surface of the fluid to be measured.

16. The ultrasonic monitor recited in claim 15, further comprising means to adjust the elapsed time of flight determined by said CPU to compensate for errors introduced by the environment within said tank, whereby to maximize the accuracy of the distance calculated by said CPU.

17. The ultrasonic monitor recited in claim 15, wherein the tank in which the fluid level is measured is covered by a top, said ultrasonic transducer being coupled to said tank below the top thereof so as to generate a narrow ultrasonic beam downwardly from the top towards the surface of the fluid to be measured, said ultrasonic transducer operating at a frequency of approximately 59 KHz.

18. The ultrasonic monitor recited in claim 15, further comprising a reference rod affixed to and extending downwardly from the protective housing of said ultrasonic transducer towards the surface of the fluid to be measured, and a plurality of acoustic reflectors spaced from one another along said reference rod and adapted to reflect respective echo signals to said ultrasonic transducer in response to the incident acoustic signal generated thereby.

19. An ultrasonic monitor to measure the level of a fluid in a tank and comprising:

an ultrasonic transducer adapted to generate an incident acoustic signal towards the surface of the fluid within the tank and to receive a return signal reflected off the surface of the fluid;

a central processing unit (CPU) being responsive to the incident and return signals generated by and reflected to the ultrasonic transducer for determining the elapsed time of flight therebetween and calculating the distance from the surface of the fluid to the ultrasonic transducer depending upon said elapsed time of flight;

an RF transceiver having an antenna and being interfaced with said CPU for receiving data therefrom corresponding to the distance calculated by said CPU, the antenna of said RF transceiver transmitting said distance data over a wireless communication path, said RE transceiver generating a wake-up signal in response to a particular ID polling signal transmitted to the antenna of said RF transceiver when it is desirable to access the data corresponding to the distance calculated by said CPU, said transceiver supplying said wake-up signal to said CPU for causing said ultrasonic transducer to generate said incident acoustic signal towards the surface of the fluid within the tank and the resulting data which is indicative of the distance calculated by the CPU to be supplied to said transceiver for transmission by said antenna; and a pulse inverter connected between a pulse output of the CPU and said ultrasonic transducer, the width of pulses supplied from said pulse output to said ultrasonic transducer by way of said pulse inverter controlling the output power of said ultrasonic transducer.

20. The ultrasonic monitor recited in claim 19, wherein said CPU includes an internal clock that is set to generate wake-up signals at predetermined time intervals, said CPU being responsive to said wake-up signals for causing said ultrasonic transducer to generate said incident acoustic signal towards the surface of the fluid within the tank so that a potential fluid overflow condition within the tank is detected on a regular basis.

21. The ultrasonic monitor recited in claim 19, further comprising a power supply interfaced with and controlled by said CPU, said power supply including a step-up regulator connected to also control the output power of said ultrasonic transducer.

22. The ultrasonic monitor recited in claim 19, further comprising a battery connected to said power supply for supplying a DC input voltage thereto.

23. The ultrasonic monitor recited in claim 22, further comprising a gas-tight, explosion-proof casing coupled to the tank and enclosing at lest some of said ultrasonic transducer, said CPU, said RF transceiver, and said battery.

24. The ultrasonic monitor recited in claim 19, wherein the tank in which the fluid level is measured is covered by a top, said ultrasonic transducer coupled to said tank below the top thereof so as to generate a narrow ultrasonic beam of approximately 10 degrees, said narrow ultrasonic beam projecting downwardly from the top towards the surface of the fluid to be measured, said ultrasonic transducer operating at a frequency of approximately 59 KHz.

25. The ultrasonic monitor recited in claim 19, further comprising an ultrasonic transceiver connected to receive an analog representation of the incident and return signals generated by and reflected to said ultrasonic transducer, said CPU having an analog-to-digital converter connected to said ultrasonic transceiver to receive said analog representation therefrom in a condition to be digitized, whereby to enable said CPU to determine the elapsed time of flight between said incident and reflected signals and thereby calculate the distance from the surface of the liquid within the tank to said ultrasonic transducer.

26. The ultrasonic transducer monitor recited in claim 25, wherein said ultrasonic transceiver includes a variable gain amplifier connected between said ultrasonic transducer and the analog-to-digital converter of said CPU, the analog representation of said incident and return signals being filtered and applied to said analog-to-digital converter by way of said variable gain amplifier.

27. The ultrasonic monitor recited in claim 25, wherein said ultrasonic transceiver includes a temperature amplifier connected between said ultrasonic transducer and the analog-to-digital converter of said CPU, an indication of the temperature within the tank at said ultrasonic transducer being applied to said analog-to-digital converter by way of said temperature amplifier.

* * * * *